Nov. 28, 1939.  B. A. KOPPITZ ET AL  2,181,404
STRAINER
Filed Feb. 7, 1938  3 Sheets-Sheet 1

Inventors
Benjamin A. Koppitz,
John A. Hartung,
By
Attorneys

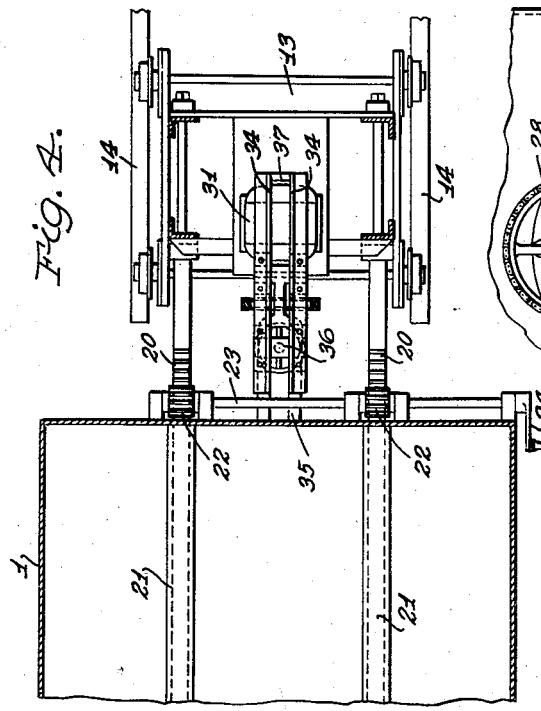
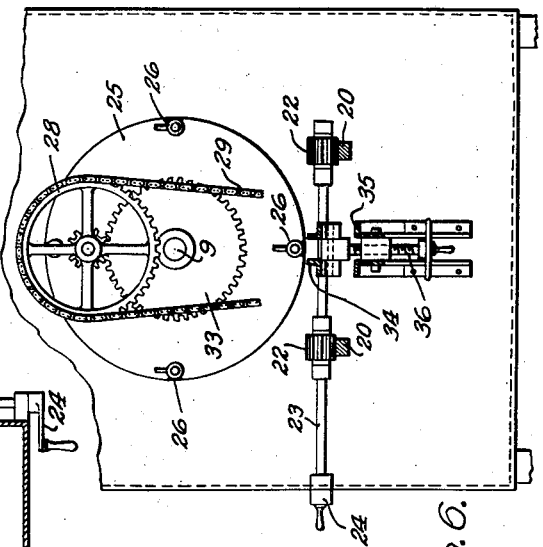
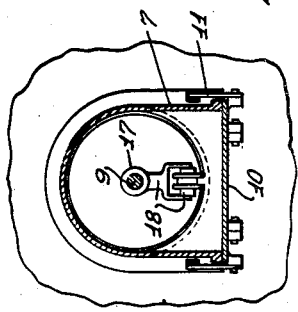
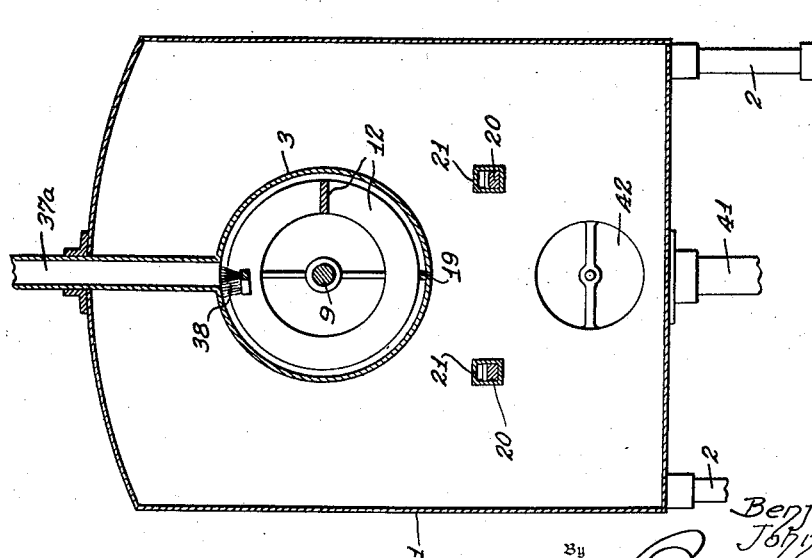

Patented Nov. 28, 1939

2,181,404

UNITED STATES PATENT OFFICE 2,181,404

STRAINER

Benjamin A. Koppitz and John A. Hartung, Detroit, Mich.

Application February 7, 1938, Serial No. 189,101

7 Claims. (Cl. 210—151)

This invention relates to apparatus designed particularly for use in the process of making beer, ale or other fermented beverages for the purpose of removing hops from the wort. Although the apparatus has been designed particularly for use in conjunction with the manufacture of alcoholic beverages which do not undergo distillation, it will be understood that its use is not confined to this field of activity alone. The apparatus is, as will hereinafter appear, adapted for use in various fields where a continuous straining operation is desired for the purpose of separating solid materials from liquids in which they are suspended.

The primary object of the present invention is to provide straining apparatus which is continuous and uniform in action, to which a mixture of liquids and solids may be supplied continuously for a prolonged period of time without impairing the uniformity of the separating action. In other words, the liquid and heavier materials may be supplied continuously without possibility of clogging the straining apparatus and without possibility of a reduction in efficiency by forcing the heavier materials through the strainer with the liquid.

Another object of the invention is to provide apparatus of the above mentioned character embodying means for removing the heavier materials from the strainer in order to avoid clogging of the strainer.

Another object of the invention is to provide apparatus of this character in which the parts may be separated for cleaning purposes.

Still another object is to provide straining apparatus for removing the hops from wort received from a brewing kettle. To this end, a strainer of substantially conical shape is provided with a combined agitator and conveyor and the wort is supplied to one end of the strainer. The combined agitator and conveyor causes the hops to be thoroughly agitated and to be impelled lengthwise of the strainer to a point where they may be discharged out the end remote from where they enter. In apparatus for such a purpose, it is essential that the strainer openings be kept open, and to this end the agitator and hop conveyor is provided with brushing means for the purpose of preventing the hops from clogging the strainer.

A still further object is to provide a hop strainer of the type above referred to embodying means for separating the parts thereof whereby they may be readily cleaned.

Figs. 3, 4, 5 and 6 are sections taken on lines in Fig. 1 bearing corresponding numerals.

Like characters of reference are employed throughout to designate corresponding parts.

Figure 1:
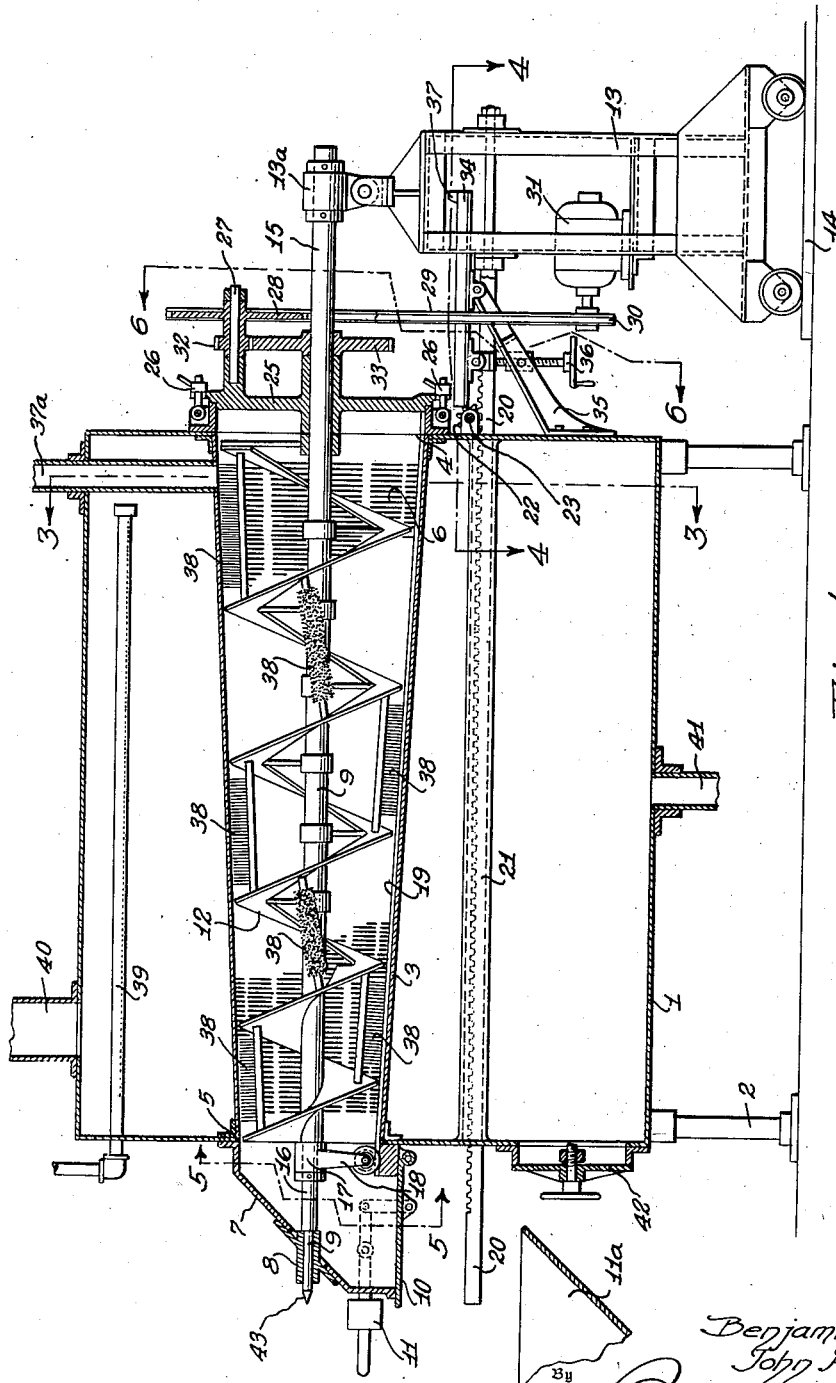
Figure 1 is a vertical section.

A housing 1, supported upon standards 2, has a substantially conical element 3 mounted therein, with its axis horizontal, and its opposite ends opening through opposite end walls at 4 and 5 of the housing 1. The element 3 has a series of comparatively narrow openings 6 which permit liquid to pass therethrough without allowing smaller solids, such as hops, to pass therethrough.

At the opening 5 an outlet formation 7 is provided in which is mounted a bearing 8 for receiving a conveyor shaft 9. The formation 7 also has a door member 10, pivoted to open downwardly, and counterbalanced by a weight 11 so that it normally remains closed. When the door 10 is opened, the heavier materials which accumulate in the formation 7 are discharged into a suitable receptacle or conveyance 11a.

The conveyor shaft 9, upon which a screw type conveyor 12 is mounted, has its end 15 projecting from the housing 1 and supported by a bearing 13a on a traveller 13. The traveller 13 is adapted to traverse rails 14 to carry the shaft end 15 away from or toward the housing 1. To support the end 16 of the shaft 9 there is provided a second movable bearing 17 on a traveller 18 which traverses a track 19 in the element 3. Connected to the traveller 13 is a pair of spaced horizontal racks 20. The racks 20 extend through tubes 21 in the housing 1 and are adapted to be moved lengthwise to cause movement of the traveller 13 by rotation of pinions 22. The pinions 22 are mounted upon a shaft 23, and a hand crank 24 is mounted upon the shaft 23 for manually rotating the same.

A bulkhead 25, having the shaft 9 extending therethrough, is secured to the housing 1 over the opening 4 by releasable elements 26. The bulkhead 25 carries a jack shaft 27 with a sprocket 28 thereon, the latter being connected by a chain 29 to a sprocket 30 operated by a motor 31 on the traveller 13. Operatively connected to the sprocket 28 is a gear pinion 32 which meshes with a gear 33 on the shaft 9. It is apparent that operation of the motor causes rotation of the screw conveyor 12.

When the shaft 23 is rotated clockwise, as shown in Fig. 1, the traveller 13 is moved and pulls the shaft 9 to the right hand side, thereby causing the traveller 18 to move along the rail 19. In order to support the end of the shaft 9 externally of the member 3, a track extension 34 is pivoted upon a bracket 35 whereby it may be moved by a hand screw 36 into an operative relationship with the track 19 after the bulkhead 25 has been removed from the opening 4. On the outer end of the track extension 34 is a safety stop 37.

In operation, with the apparatus positioned as shown in Fig. 1, the wort is fed into the element 3 through a supply pipe line 37ª, when the apparatus is used in conjunction with a brewing process. The wort comprises the liquor and hops, as they are discharged from the brewing kettle. With the screw conveyor 12 rotating, the mixture of hops and liquor is thoroughly agitated, and as the hops settle as the liquor escapes from the element 3 through the narrow openings or slots 6 they are impelled lengthwise of the element 3 and are collected in the outlet formation 7, from which they are discharged as above described.

The supply pipe line opens into the larger end of the conical element 3, and with the latter horizontally disposed, the hops must travel up-grade to the outlet end of the element 3. This relationship permits extraction of all useful liquors from the hops before they are discharged into the outlet formation 7. The extraction of liquor from the hops is further facilitated by preventing the hops from clogging the openings 6, and this is accomplished by mounting brushes 38 at intervals between the spiral vanes of the screw 12.

As the above described operation is performed, sparge water is discharged through a series of apertures in a sparge pipe 39, and vapors are withdrawn from the housing 1 through a vent pipe 40. Liquid is withdrawn from the housing 1 through the outlet pipe 41. The operation usually takes place for the duration of a working day, and before starting the next day's operation, it is the practice to thoroughly clean the entire apparatus.

Figure 2:
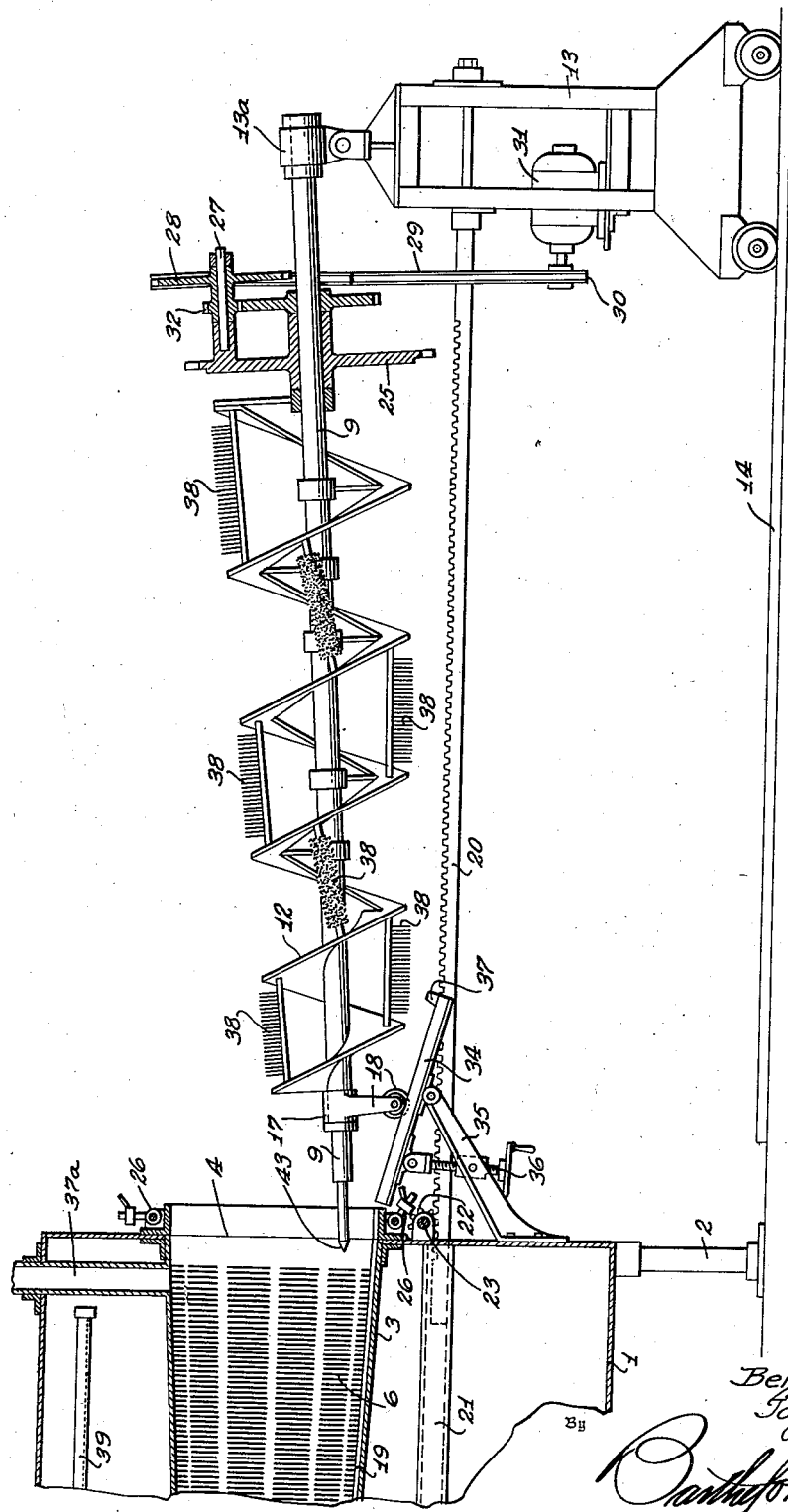
Fig. 2 is a vertical section with the parts separated.

Access may be readily had to the interior of the housing 1 through a manhole 42, but obviously this does not permit access to the interior of the element 3. To clean the latter, the securing elements 26 are released, and the hand crank 24 is rotated, impelling lengthwise movement of the racks 20, and movement of the traveller 13. When the bulkhead 25 has been carried away from the housing 1, the track extension 34 is moved from the position shown in Fig. 1 to that shown in Fig. 2, and as the traveller 13 is again moved, the traveller 18 travels out the track 19 and onto the extension 34. The traveller 18 travels downwardly on the extension 34 and leaves the opening 4 substantially unobstructed. Access may thus be had to the element 3, the screw conveyor and the brushes for cleaning the same.

After cleaning, the hand crank 24 is reversely rotated, and after the traveller 18 enters the element 3, the track extension 34 is restored to the position shown in Fig. 1. The movement is then continued until the end of the shaft 9 enters the bearing 8, at which time the bulkhead 25 is secured in place. The end of the shaft 9 is pointed at 43 to facilitate easy entrance into the bearing 8.

Although a specific embodiment of the invention has been illustrated and described it will be understood that various changes may be made within the scope of the appended claims without departing from the spirit of the invention and such changes are contemplated.

What we claim is:

1. In an apparatus of the character described, a strainer of substantially conical shape supported with its axis substantially horizontal, means for supplying a mixture of liquids and solids to said strainer adjacent to one end thereof, a screw-type conveyor for agitating said mixture and for moving the heavier materials lengthwise of said strainer, a guide, said guide extending in a plane parallel to the axis of said strainer, and a traveller supported for longitudinal movement on said guide and supporting said conveyor for movement into and out of said strainer.

2. In an apparatus of the character described, a strainer of substantially conical shape supported with its axis substantially horizontal, means for supplying a mixture of liquids and solids to said strainer adjacent to one end thereof, a screw-type conveyor for agitating said mixture and for moving the heavier materials lengthwise of said strainer, a guide, said guide extending in a plane parallel to the axis of said strainer, a traveller supported for longitudinal movement on said guide and supporting said conveyor for movement into and out of said strainer, and brushes carried by said conveyor for wiping the surface of said strainer when the former is within the latter.

3. In apparatus of the character described, a strainer of substantially conical shape supported with its axis substantially horizontal, means for supplying a mixture of liquids and solids to said strainer adjacent the larger end thereof, a screw-type conveyor, a traveller at each end of said conveyor, and guide means cooperable with said travellers for guiding said travelers whereby movement thereof carries said conveyor into and out of said strainer, said guide means extending in a plane parallel to the axis of said strainer.

4. In apparatus of the character described, a strainer of substantially conical shape supported with its axis substantially horizontal, means for supplying a mixture of liquids and solids to said strainer adjacent the larger end thereof, a screw-type conveyor, a traveller at each end of said conveyor, guide means cooperable with said travellers for guiding said travellers whereby movement thereof carries said conveyor into and out of said strainer, said guide means extending in a plane parallel to the axis of said strainer, and means for moving said travellers.

5. Apparatus as defined in claim 3 having power means on one of said travellers for rotating said conveyor.

6. In apparatus of the character described, a strainer of substantially conical shape supported with its axis substantially horizontal, means for supplying a mixture of liquids and solids to said strainer adjacent the larger end thereof, a screw-type conveyor, a traveller at each end of said conveyor, a track within said strainer for one of said travellers, a track externally of the strainer for the other traveller, and means for moving said travellers whereby they carry said conveyor into and out of said strainer.

7. Apparatus as defined in claim 6 having a track extension external of the strainer whereby the traveller riding the track within the strainer may also be moved to a point external of the strainer.

BENJAMIN A. KOPPITZ.
JOHN A. HARTUNG.